United States Patent [19]

Baxter

[11] 3,748,393

[45] July 24, 1973

[54] DATA TRANSMISSION OVER PULSE CODE MODULATION CHANNELS

[75] Inventor: John Vivian Baxter, Bishop's Stortford, England

[73] Assignee: International Standard Electric Corporation, New York, N.Y.

[22] Filed: Jan. 18, 1971

[21] Appl. No.: 107,210

[30] Foreign Application Priority Data

Feb. 17, 1970 Great Britain .................... 7,530/70

[52] U.S. Cl. .................................... 179/15 AF

[51] Int. Cl. .................................... H04j 3/06

[58] Field of Search .................. 179/15 AF, 15 BA, 179/15 BS; 178/69.5 R

[56] References Cited

UNITED STATES PATENTS

| | | | |
|---|---|---|---|
| 3,504,287 | 3/1970 | Deregnaucourt | 179/15 BS |
| 3,263,030 | 7/1966 | Stiefel | 179/15 AT |
| 3,569,631 | 3/1971 | Johannes | 179/15 BA |
| 3,591,722 | 7/1971 | Palsa | 179/2 DP |
| 3,575,557 | 4/1971 | McCowen | 179/15 BA |
| 3,396,239 | 8/1968 | Yamauchi | 179/15 BA |
| 3,663,760 | 5/1972 | DeWitt | 179/15 AF |

*Primary Examiner*—Kathleen H. Claffy
*Assistant Examiner*—David L. Stewart
*Attorney*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

An arrangement to substitute data bits for and extract these data bits from at least one channel of a PCM-TDM intelligence (voice) communication system. The data bits do not have to be synchronized with the normal PCM bit stream. The normal PCM bit stream employs n bit positions, one bit position being employed for signalling and/or synchronization and ($n$—1) bit positions being employed for conveying intelligence. Data bits equal to or less than ($n$—2) are substituted for intelligence in a selected PCM channel. The data bits are grouped at one end of the ($n$—1) bit positions and a marker bit is inserted into a bit position adjacent the last data bit. The location of the marker bit in the ($n$—1) bit positions indicates the number and repetition rate of the data bits. The position of the marker bit within the ($n$—1) bit positions is employed in the receiver to extract the data bits from the PCM bit stream and to return the data bits to their original repetition rate for further utilization.

10 Claims, 3 Drawing Figures

Fig. 1

INVENTOR
JOHN V. BAXTER
BY Alfred C. Hill
AGENT

INVENTOR
JOHN V. BAXTER
BY Alfred C. Hill
AGENT

DATA TRANSMISSION OVER PULSE CODE MODULATION CHANNELS

BACKGROUND OF THE INVENTION

This invention relates to an electrical communication system in which connections are set up in a time division multiplex (TDM) manner using pulse code modulation (PCM), and in which there are facilities for handling binary data.

Where there is a PCM network serving a number of subscribers, there are facilities for cheap and plentiful transmission of high speed binary data. This invention seeks to extend the usefulness of such a network by catering for binary data at a number of different bit rates.

SUMMARY OF THE INVENTION

A feature of the present invention is the provision of a time division multiplex pulse code modulation intelligence communication system, each pulse code modulation code combination having $n$ bit positions, where $n$ is an integer greater than three, one bit position being employed for signalling and/or synchronizing and $(n-1)$ bit positions being employed for intelligence communication purposes, and capable of enabling the communication with binary data bits by employing the $(n-1)$ bit positions of selected ones of the time division multiplex channels comprising: a source of binary data bits to be transmitted; first means coupled to the source to store the binary data bits; second means coupled to the source to count of the number of binary data bits stored during the time interval of a time division multiplex channel, the number not exceeding $(n-2)$; third means coupled to the first and second means to combine the stored binary data bits and a marker bit which combination will be substituted for the $(n-1)$ bit positions of normal intelligence in one of the time division multiplex channels, the binary data bits being grouped together at one end of the $(n-1)$ bit positions with the marker bit being disposed adjacent the last of the binary data bits, the location of the marker bit within the $(n-1)$ bit positions defining the number and repetition rate of the binary data bits associated therewith; fourth means coupled to the third means to transmit a combination of the one bit position, the binary data bits and the marker bit; fifth means coupled to the fourth means to receive the transmitted combination; sixth means coupled to the fifth means to store the marker and binary data bits; and seventh means coupled to the fifth and sixth means to generate clock pulses having a repetition rate as determined by the location of the marker bit, the clock pulses controlling the read out of the sixth means at the repetition rate.

Another feature of the present invention is the provision of a time division multiplex pulse code modulation intelligence transmission system, each pulse code modulation code combination having $n$ bit position, where $n$ is an integer greater than three, one bit position being employed for signalling and/or synchronization and $(n-1)$ bit positions being employed for intelligence communication purposes, and capable of transmitting binary data bits by employing the $(n-1)$ bit positions of each time division multiplex channel comprising: a source of binary data bits to be transmitted; first means coupled to the source to store the binary data bits; second means coupled to the source to count the number of the binary data bits stored during the time interval of a time division multiplex channel, the number not exceeding $(n-2)$; and third means coupled to the first and second means to combine the stored binary data bits and a marker bit which combination will be substituted for the $(n-1)$ bit positions of normal intelligence in one of the time division multiplex channels, the binary data bits being grouped together at one end of the $(n-1)$ bit positions with the marker bit being disposed adjacent the last of the binary data bits, the location of the marker bit within the $(n-1)$ bit positions defining the number and repetition rate of the binary data bits associated therewith.

Still another feature of the present invention is the provision of a time division multiplex pulse code modulation intelligence receiving system, each pulse code modulation code combination having $n$ bit positions, where $n$ is an integer greater than three, one bit position being employed for signalling and/or synchronization and $(n-1)$ bit positions being employed for intelligence communication purposes, wherein at least one set of binary data bits are transmitted from a remote terminal by employing the $(n-1)$ bit positions of at least one of the time division multiplex channels, the set of binary data bits includes binary data bits whose number does not exceed $(n-2)$ grouped together at one end of the $(n-1)$ bit positions and a marker bit adjacent the last of the set of binary data bits, the location of the marker bit within the $(n-1)$ bit positions defining the number and repetition rate of the data bits of the set of binary data bits comprising: a source of the set of binary data bits; first means coupled to the source to store the set of binary data bits; and second means coupled to the source and the first means to generate clock pulses having a repitition rate as determined by the location of the marker bit, the clock pulses controlling the read out of the first means at the repetition rate.

BRIEF DESCRIPTION OF THE DRAWING

Above-mentioned and other features and objects of this invention will become more apparent by reference to the following description taken in conjunction with the accompanying drawing in which.

DESCRIPTION OF THE PREFERRED EMBODIMENT

Figures 1, 2:
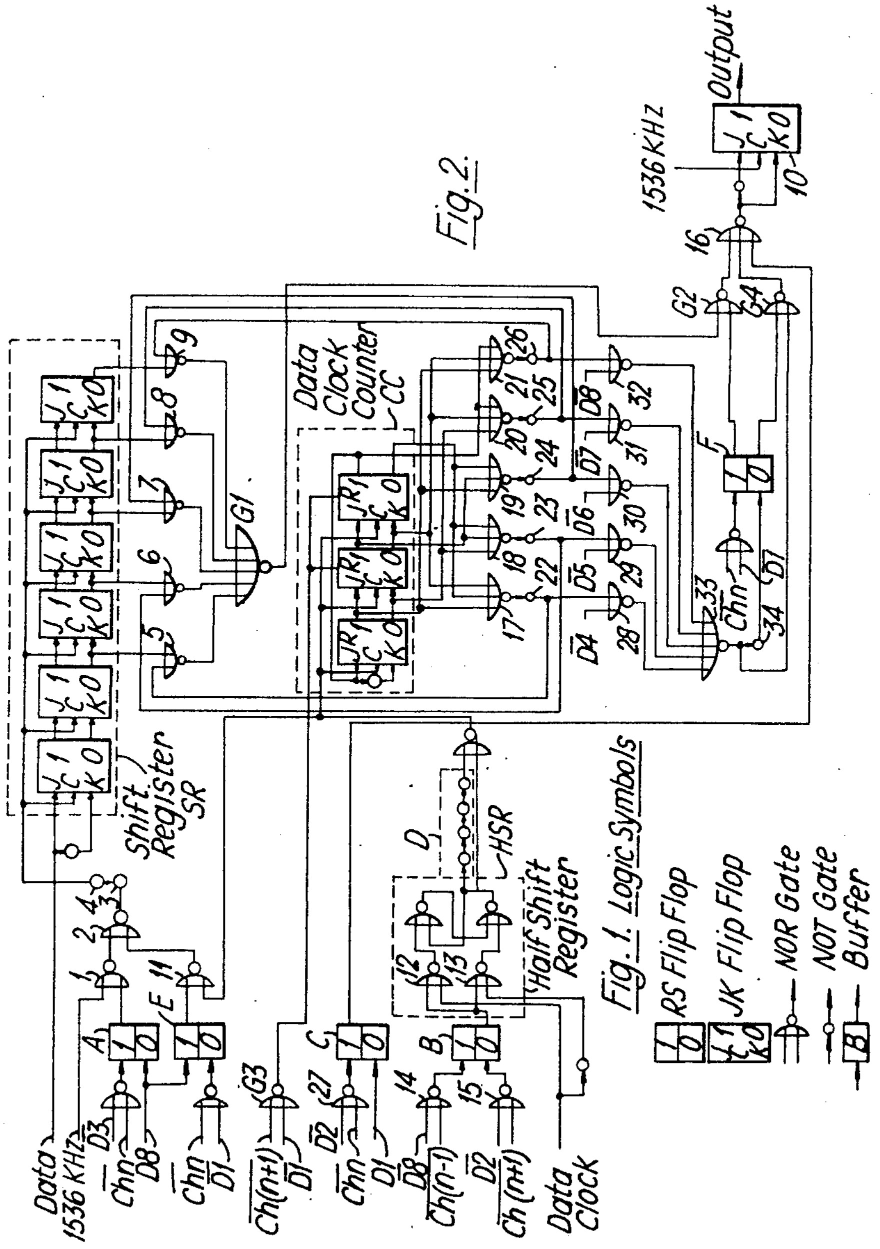
FIG. 1 is a table defining the logic symbols employed in FIGS. 2 and 3.
FIG. 2 is a logic diagram of a data transmitter, in accordance with the principles of the present invention.

One form of local area PCM system envisaged has a frame structure including 24 speech channels, each with eight digits or binary bits. One of these bits in each code combination is used for signalling and/or synchronization, leaving seven bits for intelligence, such as voice. If all of these bits were used for binary data there would be a maximum data capacity of 56 K bits (kilo bits) per second, assuming a sampling rate, i.e. channel repetition frequency, of 8 KHZ (kilohertz). To use this to the full, the subscriber's data source would have to be synchronous with the PCM clock. To overcome this limitation only six of the seven bits at the maximum are used for data, the seventh bit being position modulated for use as a marker bit to indicate the data frequency.

Incoming data from a subscriber is stored every frame period in a buffer store and a count made of the number of clock pulses during that frame. This count determines the position of the marker bit, which indicates to the receiver the data bit or repetition rate. At the receiver the position of the marker bit is recognized and is used to control a phase-locked oscillator which reads the stored data out at the original data repetition or bit rate.

With the type of PCM system referred to above, a 16–48 KHZ range of operation is achieved, as indicated in the following table.

| Data Bit Rate | Data Bits Per Frame | Data Channel Structure Time Slots 2–8 |
|---|---|---|
| 48 | 6 | X X X X X X 1 |
| 40 | 5 | X X X X X 1 0 |
| 32 X X 4 | | X X X 1 0 0 |
| 24 | 3 | X X X 1 0 0 0 |
| 16 | 2 X X 1 0 0 0 0 | |

As mentioned, bit or time slot 1 is reserved for synchronization and/or signalling, so the data bits (X in the above table) collected in the preceding frame are inserted in the bit stream, commencing with bit or time slot 2. After the last data bit, a binary 1 is inserted and the remaining bit places (if any) are filled with binary 0. Thus, the position of the first 1, reading from the right-hand end of the combination, indicates the data bit rate.

If the data source is synchronous with the PCM system, then a constant number of data bits occur every frame, but if the source is not synchronous, the frequency counter adopts one of two states, depending on which bandwidth range is appropriate to the data bit rate. To determine the mean frequency, the receiver integrates these counts over a long enough period.

It is necessary to transmit frequency information before a data message commences to ensure that the receiver is in "frequency lock" with the transmitter.

Data Transmitter (FIG. 2)

This, like the receiver, uses a standard and readily-available form of NOR logic, and, therefore, in some cases additional gates or their equivalents used as inverters (NOT gates) are needed. It is also in some cases necessary to use two or more such devices in series to ensure that pulses arrive at certain places at the correct time. Gates and other elements used in these ways are not specifically described.

Incoming data from a subscriber is entered into a six-stage shift register SR, each stage of which is a JK flip-flop. This data entry occurs under control of the data clock during each frame time, the data being written in by applying the activating clock midway through the data symbol period. At the end of the frame period the data is read from register SR by the 1536 K bit/second PCM digit clock into the PCM speech channel to be used, i.e. channel *n*. To effect this read-out a bistable A is set at a time or bit position D3 within the channel *n* in use, there being eight D time bit positions close together within the channel *n*. With bistable A set, NOR gate 1 controlled thereby opens to pass the 1536 Kc/s pulse stream to shift register SR via NOR gate 2 and inverters 3 and 4. The data bits, therefore, pass via one of the Nor gates 5–9 controlled by register SR and NOR gate G1 to the output. To this end bistable F set at D1 of channel *n* to open NOR gate G2 to the data bits from gate G1. These bits pass to the output via NOR gate 16 and a PCM clock clocked JK flip-flop 10. After the last bit has passed into register SR, bistables A and E are reset at D8 to cut off the supply of 1536

KHZ PCM clock pulses, which are controlled by the bistable A. Bistable E was set at D1 (i.e. bit position 1) of channel *n* to allow the clock pulse to pass through gates 1 and 2 when A was set.

The store SR can now receive more data. Since the channel period of 5.2 microseconds is less than half of a clock period at the highest data bit rate (this period is at least 10.4 microseconds), there is no loss of data. constant It is necessary to ensure that data is not written into register SR during read-out. This is accomplished by employing half-shift register HSR to delay the activating pulse edge which times read in through means of NOR gate 11. This half-shift register is, in effect, a gated bistable assembled from individual NOR gates. The bistable of register HSR is set by the output from the data clock and a blanking pulse which are gated together in NOR gates 12. This blanking pulse is generated by an R–S flip-flop B, and as can be seen from the controls thereof, obtained from NOR gates 14 and 15, the blanking pulse embraces a period from channel (*n*–1), digit 8 to channel (*n*+1), digit 2. The inverse phase of the data clock is gated with the same blanking pulse in NOR gate 13 to reset the bistable of HSR. As there is a risk of non-coincident switching of this bistable, a 100 microsecond delay D is inserted to remove spurious pulses of less than this duration.

The clock counter CC, which consists of three JK bistables or flop flops, counts the number of data clock pulses during a frame period. This counter is controlled from the half-shift register HSR, itself data clock controlled, so that it counts the data clock pulses, and, hence, the number of data bits during a frame period. The count is staticized for use during data transmission to position the marker bit. This reduces the isochronous data clock stream to a series of discrete frequency counts at the end of each frame. Counter CC is reset via NOR gate G3 at the end of each frame at a time channel (*n*+1), digit 1.

The frequency count indicates how many bits in the shift register are data. These data bits, when inserted into the channel *n* time slot should retain their relative bit positions with bit 1 occupying the channel *n*, digit 2 position. This is achieved by reading register SR from the appropriate stage thereof as controlled by gates 5–9 which in turn are controlled by the count of counter CC. The count of counter CC is determined by one of NOR gates 17–21 and through the appropriate one of NOT gates 22 26 controls the associated one of gates 5–9 to read register SR into gate G1. The output gate 16, which controls the output JK bistable or flip flop 10, is opened under control of a bistable or RS flip flop C one digit period before the first reading clock pulse is applied to register SR, namely, at channel *n*, bit position D2 as provided by NOR gate 27.

Bistable or flip flop F controls the position at which the frequency indicating marker bit is inserted, it being set at channel *n*, digit 1 period, and is not reset until the appropriate number of data bits have been read from register SR. This latter control is also effected from the clock counter CC, via NOR gates 28–32 controlled by the inverses of D4 to D8, the outputs of which are coupled to NOR gate 33. The digit which resets flip flop F via NOT gate 34 is also injected, via gate G4, into the time slot immediately after the last data bit, after which any remaining bit places are filled with spaces (binary 0) *before gating with a pulse embracing the channel n* period.

The output JK flip flop 10 retimes the data bits, under the control of the PCM clock, i.e. the 1536 KHZ clock input to flip flop 10. The PCM stream of multiplexed speech is, of course, inhibited during channel *n*, the composite signal, which usually includes both PCM speech and the data being sent over the paired cable at the 1536 KHZ digit clock rate.

The cooperation between register SR and counter CC may be restated as follows. When 16 K bit data is present only two bits enter register SR and these appear in the two left hand stages, for 24 K bit data there are three bits in the three left-most stages of register SR, and so on. Thus, for 16 K bit data register SR is read out by enabling only gate 5, for 24 K bit data only gate 6 is enabled, for 32 K bit data only gate 7 is enabled, and so on. In every case read out is at the high rate of 1536 K bit via only one of the gates 5–9 feeding gate G1.

While data is entering register SR, counter CC counts the number of data pulses which enter register SR. Hence, at the end of the frame period in which data is stored in register SR, the count of the number of data pulses is represented by the count of counter CC. This count is decoded by the appropriate one of gates 17–21 and the output of these gates are inverted by gates 22–26. One of these gates have an output to enable the associated one of gates 5–9. Hence, the data is "clocked out" of register SR via the appropriate one of gates 5–9. This operation effectively is a comparison between the number of data bits in register SR and the count of counter CC with a read out from register SR being enabled when the number and the count are equal.

As already indicated, for a particular number *x* of data bits, and similarly for that number *x* of clock pulses, only one of gates 17–21 will be opened by counter CC. For example, if $x = 4$, then a count of 4 is present in counter CC and gate 19 opens. Its output is inverted by gate 24, and in addition to enabling gate 7, gate 30 is enabled to let a $\overline{D6}$ pulse pass to gate 33. This pulse occurs at such a time as to reach the output of flip flop 10 after the last of the four data bits. Consequently, gate G2 gates through the four data bits into the channel in use in its bit positions or time slots 2–3—4–5. Then the $\overline{D6}$ pulse via gates 33 and 34 reverses flip flop F, so that gate G4 now passes the $\overline{D6}$ pulse and the following 0's.

Figure 3:
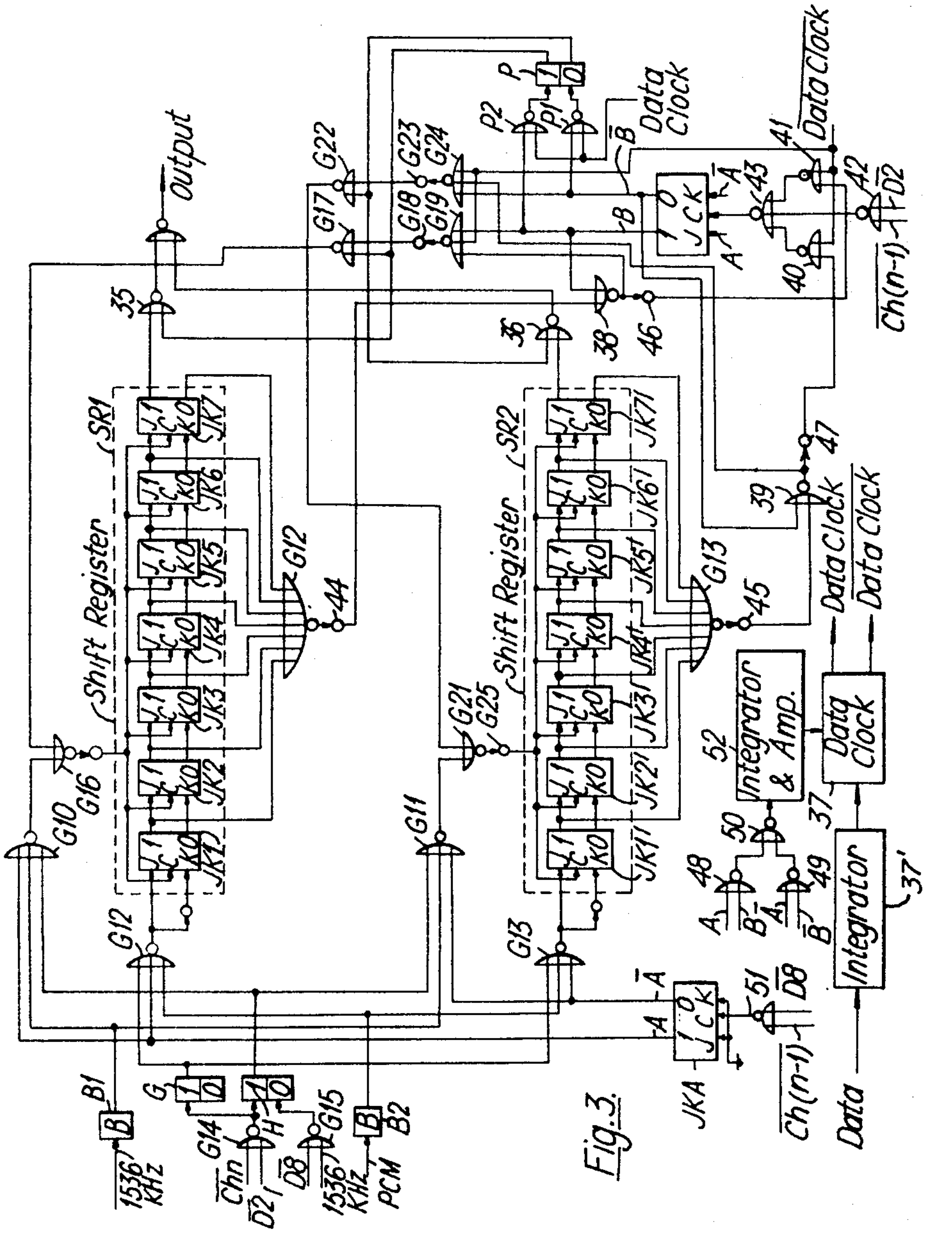
FIG. 3 is a logic diagram of a data receiver in accordance with the principles of the present invention.

Data Receiver (FIG. 3)

The data information in channel *n* is written on alternate frames into two shift registers SR1 and SR2 under the control of a JK bistable or flip flop JKA, which is switched at the PCM frame rate. Shift register SR1 input NOR gate G12 receives the A output of flip flop JKA, the PCM input from buffer B2 and the 1 output from RS flip flop G set at time channel *n*, digit 2 by means of NOR gate G 14. Shift register SR2 input NOR gate G13 receives the $\bar{A}$ output of flip flop JKA, the PCM input from buffer B2 and the 1 output from flip flop G. This use of two stores at the receiving end avoids stringent phase requirements which would have to be met by the phase lock oscillator of data clock 37 which will be discussed later.

As in the transmitter, the timing is such that the first writing clock pulse is applied via buffer B1 and NOR gate G10 or G11, depending on which of SR1 and SR2 is receiving, half a digit later than the application of data to SR1 or SR2 through gates G12 or G13. This avoids ambigutiies in setting the stores due to varying delays between data and clocks.

Gate G10 receives the PCM clock input from buffer B1, the A input from flip flop JKA and the 1 output from RS flip flop H which is set at time channel *n*, digit 2 by means of gate G14, flip flop H being reset by the PCM clock during digit time D8 by NOR gate G15. The actual clock pulse for shift register SR1 is provided through NOR gate G16 coupled to the output of gate G10 and the output of NOR gate G17. Gate G17 is under control of the data clock, through means of NOR gates P1 and P2 and the 1 output of flip flop P, and the output of NOT gate G18 via NOR gate G19. Gate G19 is under control of the inverse of the data clock, the B output of flip flop JKB and the output of NOR gate 38 which in turn is controlled by the output of NOR gate G12 via NOT gate 44 and the B output of flip flop JKB. The output of gate G16 is inverted by NOT gate G20.

Gate G11 receives the PCM clock input from buffer B1, the $\bar{A}$ input from flip flop JKA and the 1 output from flip flop H. The actual clock pulse for shift register SR1 is provided through NOR gate G21 coupled to the output of gate G11 and the output of NOR gate G22. Gate G22 is under control of the data clock, through means of NOR gates P1 and P2 and the 0 output of flip flop P, and the output of NOT gate G23 via NOR gate G24. Gate G24 is under control of the inverse of the data clock, the $\bar{B}$ output of flip flop JKB and the output of NOR gate 39 which in turn is controlled by the output of NOR gate G13 via NOT gate 45 and the $\bar{B}$ output of flip flop JKB. The output of gate G21 is inverted by NOT gate G25.

The registers SR1 and SR2 each consists of seven JK flip flops, data being both written in and read out serially, and always being read out from the 1 terminal of JK7 and JK7' (at the right-hand end). As each clock pulse moves data along one stage, it is necessary to have an extra stage of storage or to suppress the first reading clock pulse. The latter is done using NOR gates P1 and P2 and RS flip flop P. Flip flop P controls the time at which the output NOR gates 35 and 36 of shift registers SR1 and SR2 are opened.

To read, the incoming data channel to be read is identified and the seven digits are written into SR1 or SR2 by the PCM digit clock, the data entering via buffer B2. The data clock frequency of the receiver is determined by integration of the frequency of the incoming data over a relatively large number of frames in integrator 37'. The key to this date repetition rate recovery by integration is the position of the marker bit within the PCM bit positions of the channel *n*. The results of this determination sets the receiver data clock 37 to its condition appropriate to the rate at which that data is to be read-out of register SR1 or SR2. If the previous channel of data was in register SR1, then this is read-out by the correctly-phased reconstruction data clock for 125 microseconds. When register SR1 is emptied, this is recognized and the reading clock is switched to register SR2 by JK flip flop JKB, resister SR2 having been written into in the meantime. This continues with the data clock being alternately switched between registers SR1 and SR2. The recognition referred to above occurs when a shift register condition is 1000000, which condition means that the register is empty. This is detected by NOR gates G12 and G13, which control in an obvious way the aforementioned bistable JKB through means of NOR gates 38–43 and NOT gates 44–47.

In a data channel time slot, in addition to the first digit which is used for signalling and/or synchronization, there are S data digits (S ≤ 6), one marker digit or bit and (6–S) spaces. Since the data is so arranged that it always occupies digit places 2 onwards, when all the data has been read from a shift register, the first digit after the data is in the first stage (stage JK7 or JK7') of shift registers SR1 and SR2 is a mark 1 the marker bit and is followed by "filler" spaces or 0. This explains the detection of 1000000 as the "empty" indication.

Flip flop JKB is switched by pulses derived from the data clock pulses, i.e. the inverse phase of the clock pulses, which are gated through gates 40, 41 and 43 when the data has been correctly read from the shift registers SR1 and SR2. Reading the registers SR1 and SR2 by the data clock pulses via flip flop P and gates 35 and 36 and switching flip flop JKB by the inverse of the data clock avoids ambiguities of the counting period.

The receiver has an automatic frequency "end stop" control which ensures that if the reconstructed data clock frequency is incorrect, a maximum correction signal is applied to the data clock oscillator. When the reconstructed data frequency is correct, phase control predominates. This is achieved by comparing the phase of a 4Kc/s square wave A generated by the bistable JKA, which is triggered just before the channel being dealt with has occurred, with another 4 Kc/s waveform B, controlled by the time at which registers SR1 and SR2 are read and generated by flip flop JKB. As can be seen from FIG. 3 the comparator is a set of NOR gates 48–50 which performs the EXCLUSIVE OR function.

The set and clear inputs of flip flop JKB are connected directly to the outputs of flip flop JKA and are only gated through to the store on the negative transistions of the data clock. If the data clock frequency is too high (fast) the shift register is read early during the frame, however, flip flop JKB does not change its state until the first activating data clock edge after flip flop JKA has changed. Flip flop JKA changes its state at channel ($n$–1), digit 8 period through NOR gate 51. In this way a control is effected if the data clock is too fast, since that condition of trying to read a shift register before it has been written into is also overcome. When the reading clock is too fast it is necessary to blank off further clock pulses to the relevant shift registers SR1 or SR2.

If the reading clock frequency is too low (slow) then during the frame period of 125 usecs the shift register store is not emptied, so data clock pulses are not allowed to trigger flip flop JKB, however, this flip flop JKB Is triggered by Ch ($n$–1), D2 pulses through gate 42. This allows the maximum period of time for each shift register to be read before the clock waveform is switched over, and again the time in which flip flop JKB switches in relation to that of flip flop JKA gives a means of control. When flip flop JKB has been triggered, the cahnging edge of its output is used to close gates 38 and 39 letting through these triggering pulses. In this way the likelihood of erroneous sneak pulses triggering the flip flop JKB is overcome.

When the reconstructed data frequency is correct, phase control predominates. The EXCLUSIVE OR phase comparator mentioned above gives an 8 Kc/s square waveform at its output the duty cycle of which is dependent on the phase relationships of inputs A and B. The loop including integrator and amplifier 52 is arranged to drive the phase of input B towards a quadrature relationship with input A, this being the position of zero phase error. The departure from the quadrature position is dependent on the amount of gain around the loop. The oscillator of clock 37 which supplies the local clock is a phase locked oscillator, the control therefore, which includes the comparator already mentioned embodying a phase locked loop. The effect of this is that the phase of the 4 Kc/s waveform derived from flip flop JKA and the output from flip flop JKB are compared and the local clock adjusted to bring them into agreement.

While I have described above the principles of may invention in connection with specific apparatus it is to be more clearly understood that this description is made only by way of example and not as a limitation to the scope of my invention as set forth in the objects thereof and in the accompanying claims.

I claim:

1. A time division multiplex pulse code modulation intelligence transmission system, each pulse code modulation code combination having $n$ bit positions, where $n$ is an integer greater than three, one bit position being employed for signalling and/or synchronization and ($n$–1) bit positions being employed for intelligence communication purposes, and capable of transmitting binary data bits by employing said ($n$–1) bit positions of each time division multiplex channel comprising:

a source of binary data bits in a time division multiplex format to be transmitted;

first means coupled to said source to store said binary data bits;

second means coupled to said source to count the number of said binary data bits stored during the time interval of a time division multiplex channel of said format, said number not exceeding ($n$–2); and third means coupled to said first and second means to combine said stored binary data bits and a single marker bit, to substitute said stored binary data bits and said marker bit for said ($n$–1) bit positions of normal intelligence in one of said time division multiplex channels, and to group said stored binary data bits and said marker bit together at one end of said ($n$–1) bit positions with said marker bit being disposed in the bit position immediately following the last bit of said stored binary data bits so that the location of said marker bit within said ($n$–1) bit positions defines the number and repetition rate of said stored binary data bits associated therewith.

2. A system according to claim 1, wherein said first means includes
a shift register having ($n$–2) stages.

3. A system according to claim 1, wherein said second means includes
fourth means coupled to said source to generate clock pulses in synchronism with said binary data bits, each of said clock pulses controlling the insertion of one of said binary data bits into said first means, fifth means coupled to said fourth means to count said clock pulses, and sixth means coupled to said first means and said fifth means to compare the number of said binary data bits stored in said first means with the count of said fifth means and to insert said marker bit in the proper location within said ($n$—1) bit positions and clear said first means and said fifth means when said number and said count agree.

4. A time division multiplex pulse code modulation intelligence receiving system, each pulse code modulation code combination having $n$ bit positions, where $n$ is an integer greater than three, one bit position being employed for signalling and/or synchronization and ($n$—1) bit positions being employed for intelligence communication purposes, wherein at least one set of binary data bits are transmitted from a remote terminal by employing said (n—1) bit positions of at least one of time division multiplex channels, said set of binary data bits including binary data bits whose number does not exceed (n-2) grouped together at one end of said (n-1) bit positions and a single marker bit in the bit position immediately following the last bit of said set of binary data bits, the location of said marker bit within said (n-1) bit positions defining the number and repetition rate of the data bits of said set of binary data bits comprising:

a source of said set of binary data bits;

first means coupled to said source to store said set of binary data bits; and second means coupled to said source and said first means to generate clock pulses having a repetition rate as determined by said location of said marker bit within said (n-1) bit positions, said clock pulses controlling the read out of said first means at said repetition rate.

5. A system according to claim 4, wherein said first means includes a shift register having ($n$—1) stages.

6. A system according to claim 4, wherein said source includes a plurality of said sets of binary data bits, and said first means includes two shift registers each having ($n$—1) stages, said shift registers being employed alternately on alternate frames of the time division multiplex signal.

7. A time division multiplex pulse code modulation intelligence communication system, each pulse code modulation code combination having $n$ bit positions, where $n$ is an integer greater than three, one bit position being employed for signalling and/or synchronizing and ($n$—1) bit positions being employed for intelligence communication purposes, and capable of enabling the communication with binary data bits by employing said ($n$—1) bit positions of selected ones of the time division multiplex channels comprising:

a source of binary data bits in a time division multiplex format to be transmitted;

first means coupled to said source to store said binary data bits;

second means coupled to said source to count the number of said binary data bits stored during the time interval of a time division multiplex channel of said format, said number not exceeding ($n$—2);

third means coupled to said first and second means to combine said stored binary data bits and a single marker bit, to substitute said stored binary data bits and said marker bit for said ($n$—1) bit positions of normal intelligence in one of said time division multiplex channels, and to group said stored binary data bits and said marker bit together at one end of said ($n$—1) bit positions with said marker bit being disposed in the bit position immediately following the last bit of said stored binary data bits so that the location of said marker bit within said ($n$—1) bit positions defines the number and repetition rate of said stored binary data bits associated therewith;

fourth means coupled to said third means to transmit a combination of said one bit position, said stored binary data bits and said marker bit;

fifth means coupled to said fourth means to receive said transmitted combination;

sixth means coupled to said fifth means to store said marker bit and said binary data bits; and seventh means coupled to said fifth and sixth means to generate clock pulses having a repetition rate as determined by said location of said marker bit within said ($n$—1) bit positions, said clock pulses controlling the read out of said sixth means at said repetition rate.

8. A system according to claim 7, wherein said first means includes a shift register having ($n$—2) stages.

9. A system according to claim 7, wherein said second means includes eigth means coupled to said source to generate clock pulses in synchronism with said binary data bits, each of said clock pulses controlling the insertion of one of said binary data into said first means, ninth means coupled to said eigth means to count said clock pulses, and tenth means coupled to said first means and said ninth means to compare the number of said binary data bits stored in said first means with the count of said ninth means and to insert said marker bit in the proper location within said ($n$—1) bit positions and clear said first and ninth means when said number and said count agree.

10. A system according to claim 7, wherein a plurality of said time division multiplex channels contain said transmitted combination, and said sixth means includes two shift registers each having ($n$—1) stages, said shift registers being employed alternately on alternate frames of the time division multiplex signal.

* * * * *